Nov. 16, 1965  W. E. REYNOLDS ETAL  3,217,845
RIGIDIFIED CORRUGATED STRUCTURE
Filed Feb. 6, 1961  8 Sheets-Sheet 1

INVENTORS:
WILLIAM E. REYNOLDS
SEYMOUR BAZELL
ERICH H. KOELLER
STEPHEN B. FACCIN
BY Gravely, Lieder & Woodruff
ATTORNEYS.

INVENTORS:
WILLIAM E. REYNOLDS
SEYMOUR BAZELL
ERICH H. KOELLER
STEPHEN B. FACCIN

BY Gravely, Lieder & Woodruff
ATTORNEYS.

Nov. 16, 1965  W. E. REYNOLDS ETAL  3,217,845
RIGIDIFIED CORRUGATED STRUCTURE
Filed Feb. 6, 1961  8 Sheets-Sheet 6

INVENTORS:
WILLIAM E. REYNOLDS
SEYMOUR BAZELL
ERICH H. KOELLER
STEPHEN B. FACCIN

BY Gravely, Lieder & Woodruff
ATTORNEYS.

FIG.17

United States Patent Office 3,217,845
Patented Nov. 16, 1965

3,217,845
RIGIDIFIED CORRUGATED STRUCTURE
William E. Reynolds, Riverside, Seymour Bazell and Erich H. Koeller, Chicago, and Stephen B. Faccin, Oak Lawn, Ill., assignors, by mesne assignments, to Crown Zellerbach Corporation, San Francisco, Calif., a corporation of Nevada
Filed Feb. 6, 1961, Ser. No. 87,282
5 Claims. (Cl. 29—191)

This invention relates to an improved high strength economical lightweight corrugated sheet and/or structure and a process and machine for making same. In particular, this invention relates to an improved product for the airframe, shipbuilding, truck manufacturing, building and construction, and other industries. This product may be made from stainless steel, aluminum, plastic, or any other suitable material.

With the advent of aircraft having operational speeds exceeding Mach 1 and missiles, the requirement for higher quality structural frames has been continually increasing. There has been an increasing need for a material which has a high strength-to-weight ratio, but which is economical to make. Low density sandwich panels having thin face sheets with a lightweight stabilizing core have been developed. At present, there are two basic corrugated sheet or core designs for sandwich panels in use. One is a honeycomb core, either square or hexagonal, which provides the highest strength-to-weight ratio but is very costly to produce. The second is a corrugated (sine-wave) core which has a much lower strength-to-weight ratio than honeycomb core, but is far less costly to make. Corrugated panel is capable of taking considerably more load in the longitudinal direction of the corrugations than in the transverse direction. This directional strength can have advantages or disadvantages, depending on how the panel is used.

One of the principal objects of the present invention is to make a core and sandwich panel having a high strength-to-weight ratio but a low cost. In particular, an object is to provide a core and sandwich panel whose strength-to-weight ratio approximates that of honeycomb but whose cost of manufacture approximates that of a corrugated sine-wave core and sandwich panel.

Another object of this invention is to provide a rigidified corrugated structure which can be made rapidly with one pass through cooperating rolls. Another object is to provide walls in a rigidified corrugated structure core whose effective column height is less than the wall height in a comparable corrugated sine-wave structure and is less than the vertical distance between the uppermost and lowermost portions of the structure, thereby increasing its strength. Another object is to provide primary corrugations in a core structure which have secondary corrugations thereon, said secondary corrugations being in the tops and bottoms and in the walls of said primary corrugations. Another object is to so dimension the primary and secondary corrugations that maximum strength-to-weight is obtained. Another object is to provide reinforced corners or flanges on the primary corrugations at the point where bending is likely to occur, thereby strengthening the structure. Another object is to provide a compound corrugated core to which face sheets can be rapidly joined by automatic equipment, and which are capable of being stacked with or without interposed panels in various combinations or in different positions on each other to increase the thickness of said core. Still another object is to provide a structure which can be formed, if desired, in any one of a number of ways including vertically movable dies or plattens.

Another object of this invention is to provide a process for making a rigidified corrugated structure in one pass through cooperating rolls. Another is to form the primary corrugations sequentially or serially one after the other, and to form the secondary corrugations thereon substantially simultaneously. Another object is to provide a process for rigidifying material in which said material is bent and is stretched or drawn at predetermined points therein. Another object is to provide a process for rigidifying material in which the material is bent and drawn substantially at the same time.

A further object of this invention is to provide a machine for making the compound corrugated structure described herein, said machine having cooperating rolls formed with individual teeth thereon, said teeth being spaced on raised portions circumferentially around said rollers and being spaced intermittently between the side edges of said rollers, the teeth of one roller not meshing with the teeth of the other roller. Another object is to provide rollers which may be made from a plurality of two different kinds of discs which are alternately positioned.

The present invention is embodied in the rigidified corrugated core, in the sandwich panel in which said core is used, and in the process and in the machine for making same, as hereinbefore and hereinafter described.

The invention also consists in the parts and in the arrangements and combinations of parts and in the process hereinafter described and claimed. In the accompanying drawings, which form part of this specification and wherein like numerals and symbols refer to like parts wherever they occur:

Figure 1:
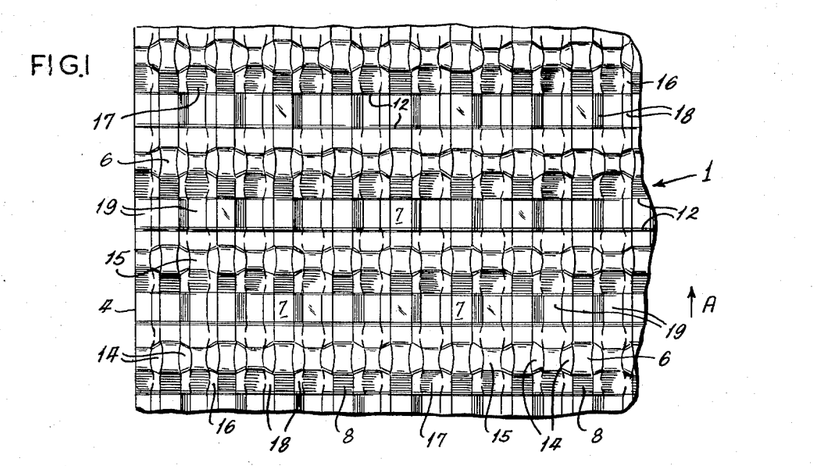
FIG. 1 is a top plan view of a rigidified or compound corrugated core or structure embodying the present invention.
Figure 2:
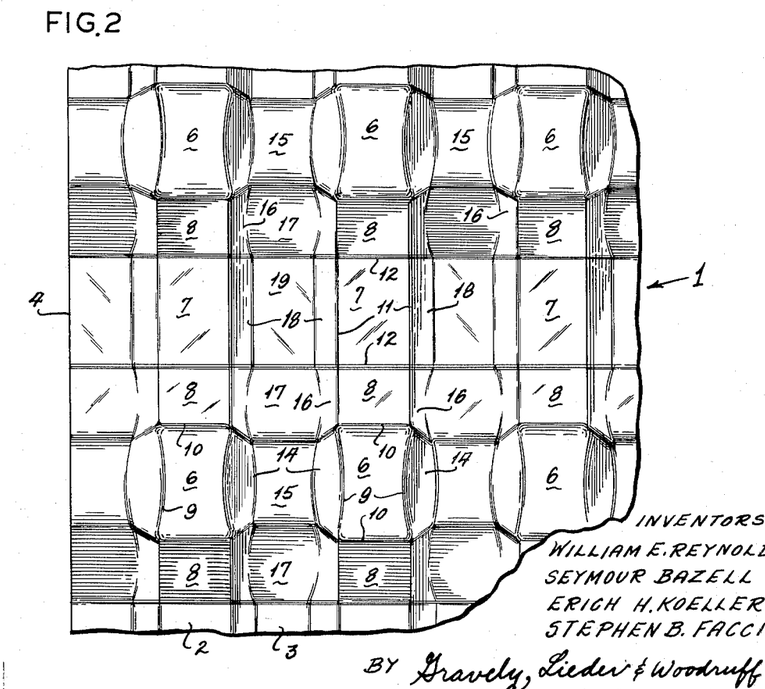
FIG. 2 is an enlarged top plan view of several corrugations.
Figures 3, 4:
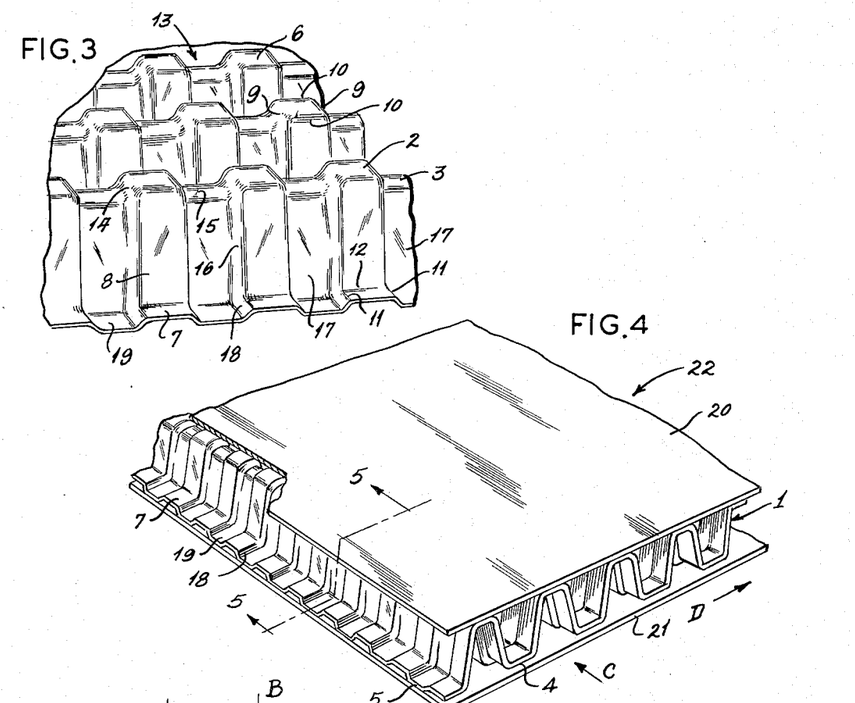
FIG. 3 is a perspective view thereof.
FIG. 4 is a perspective view of a sandwich panel having a rigidified corrugated core.

Referring now to the drawings in detail, FIGS. 1–3 show a core or structure 1 embodying the present invention. This core 1 may be made by passing a relatively flat sheet of deformable material through cooperating die rollers, described hereinafter. The core 1 has a plurality of primary corrugations 2 with secondary corrugations 3 thereon. The primary corrugations 2 comprise the usual crests and valleys which extend longitudinally between opposite ends or sides 4, and the secondary corrugations 3 extend between opposite sides or ends 5. Each primary corrugation 2 has a crest or a top 6, a bottom 7, and a wall 8 therebetween. The precise shape and dimension of each of these three components may vary within limits. The top portions 6 of the primary corrugations 2 are relatively flat and have longitudinally extending curved ridges 9 and transversely extending curved ridges 10. The wall portions 8 are substantially planar or straight and slightly inclined. The bottom portions 7 of the primary corrugations 2 are relatively flat and have longitudinally extending curved ridges 11 and transversely extending curved ridges 12.

Figure 5:
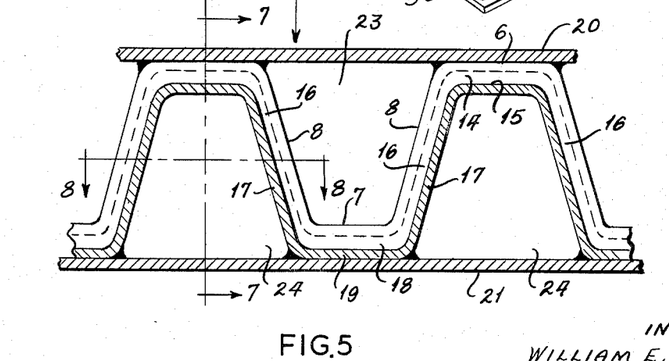
FIG. 5 is an enlarged cross-sectional view taken along the line 5—5 of FIG. 4.
Figure 6:
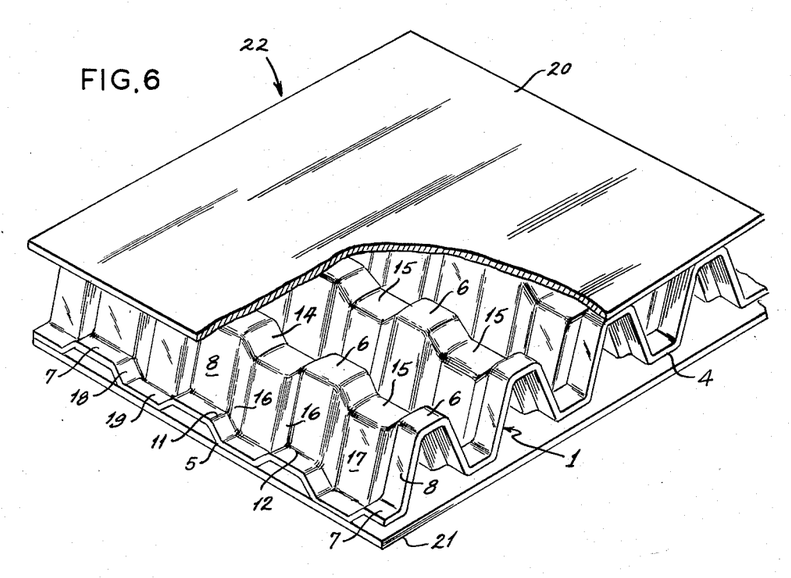
FIG. 6 is an enlarged partially broken perspective view of a rigidified sandwich panel.

The depth of the portions off-set from the primary corrugations 2, as shown in FIGS. 3–5, is greater along the tops 6 and bottoms 7 than along the walls 8. Of course, this depth may be equal to or less than the off-set depth along the side walls if desired. In effect, the secondary corrugations 3, or portions thereof, are simply off-set or displaced portions of the primary corrugations 2 and are positioned out of the original plane into predetermined planes at predetermined distances from the original plane. The entire portions which are off-set from each primary corrugation 2 are designated by the numeral 13 and are aligned longitudinally in the direction of arrow A shown in FIG. 1.

The compound corrugated core 1 so formed has relatively flat tops 6 with longitudinally extending curved ridges 9, and connectors 14 extending angularly downwardly to saddles or the crests 15 of the secondary corrugations 3, which saddles would have been in alignment with the tops 6 of the primary corrugations 2 if the secondary corrugations 3 had not been formed. The walls 8 of each primary corrugation 2 terminate in fillets with angular connecting portions or connectors 16 extending into walls 17 of the secondary corrugations 3. The bottoms 7 of the primary corrugations 2 have curved ridges 11 with connectors 18 extending angularly downwardly to the bottoms 19 of the secondary corrugations.

Thus, when looking in the direction of the arrow A in FIG. 1, or as best shown in FIG. 5, the tops 6 and walls 8 and bottoms 7 of the primary corrugations 2 have angular connectors 14, 18, and 16 substantially upright with respect to the adjacent portions of the primary corrugations extending into the saddles 15, walls 17, and bottoms 19 of the secondary corrugations 3. The tops 6 and bottoms 7 of the primary corrugations 2 are in a higher plane than the tops 15 and bottoms 19 of the off-set portions. The walls 8 and 17 are parallel to each other, but the walls 8 depending from the tops 6 of the primary corrugations 2 are positioned farther apart from each other than the walls 17 depending from the tops 15 of the secondary corrugations 3.

This core or sheet 1 has unusually high strength-to-weight properties, which is caused by the design in which there are many angular connectors 14, 16, and 18 and off-set portions 3 which add strength. In addition, the compressive strength in the direction of the arrow B in FIG. 5, is greatly increased by the fact that the height of each of the walls 8 and 17 is less than the distance between the upper and lower portions of the sheet 1. For example, a sheet one-half inch high in a vertical direction would have a wall greater than one-half inch with sine-wave corrugations and exactly one-half inch high in honeycomb, but has a wall height of less than one-half inch with the present rigidified or compound corrugations. This shortened effective wall height provides greater strength. Thus the core 1 behaves as though it were a structure of lesser height. The depth or height of the off-set portions 3 depends upon several factors, including the nature of the material, the speed of the die rollers if such rollers are used, etc.

In normal use, the core 1 may have one or two facing sheets 20 and 21 secured thereto, as shown in FIGS. 4–7, to form the sandwich panel 22. These sheets 20 and 21 are fixed to the core 1 at the flat tops 6 and flat bottoms 19 by suitable means, such as bonding, welding, soldering, adhesives, rivets, or brazing. In some instances, the tops 6 and bottoms 19 can be provided with indentations or with openings completely through the material to further aid the bonding material in making a rigid bond between the sheets 20 and 21 and the core 1. When looking in the direction of the arrow C in FIG. 4, the spaces 23 and 24 between the walls of the core form straight channels or conduits between the opposite sides 4 of the core 1.

Figures 9, 10:
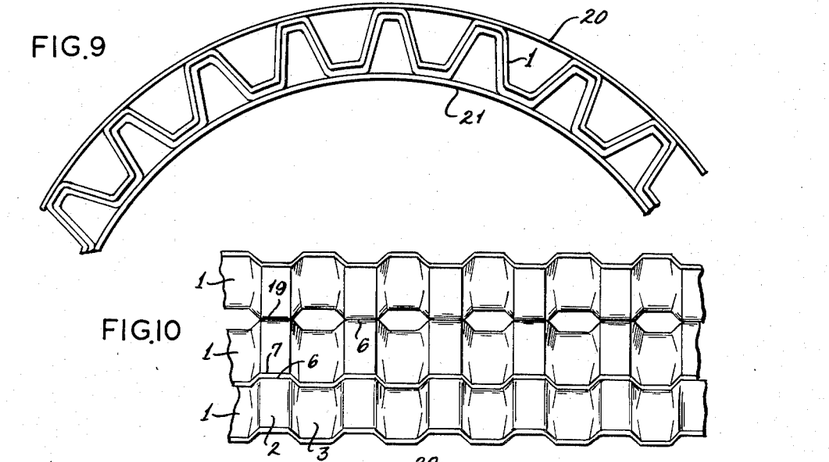
FIG. 9 shows a curved rigidified corrugated sandwich panel embodying the present invention.
FIG. 10 shows a plurality of rigidified corrugated cores secured to one another in various fashions.

FIG. 9 shows a core 1 curved and positioned between curved sheets 20 and 21 to provide a structure having high strength-to-weight ratio, which for example may be used for the leading edge of aircraft wings and the like. If desired, the curve shown can be extended into a complete circle to form a closed pipe or column. A fluid may be directed through such a pipe if desired.

When additional thickness is desired, individual cores 1 may be stacked one on the other in one of several different manners. As shown in FIG. 10, the primary and secondary corrugations 2 and 3 may be aligned so that the top 6 of a primary corrugation 2 is received by the raised bottom 7 of the primary corrugation 2 of the core 1 thereabove. To give greater height, the cores 1 may be stacked with the bottoms 19 of the secondary corrugations 3 of the upper core secured to the tops 6 of the primary corrugations 2 of the lower core. As shown in FIG. 10, the middle core has its bottoms 7 nested over the tops 6 of the lower core, whereas the bottoms 19 of the upper core rest on the tops 6 of the middle core.

Figure 11:
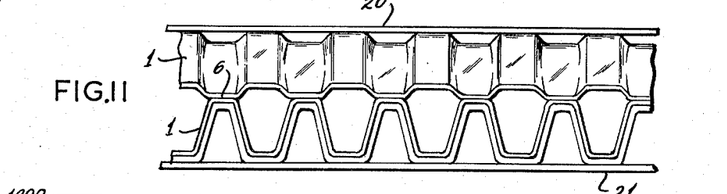
FIG. 11 shows one compound corrugated structure secured transversely to another compound corrugated structure.

In still another form, as shown in FIG. 11, the cores may be joined with their primary corrugations extending 90 degrees to one another. With such an arrangement, however, the tops 6 of the primary corrugations 2 should be spaced an equal distance from each other both laterally and longitudinally so that they form a square and present joining surfaces at the proper positions. If desired, the space between primary corrugations 2 may be a multiple of the distance between the tops 6 and a single primary corrugation 2. In either form shown in FIGS. 10 and 11, sheets may be inserted between the stacked cores 1 if desired.

Figure 12:
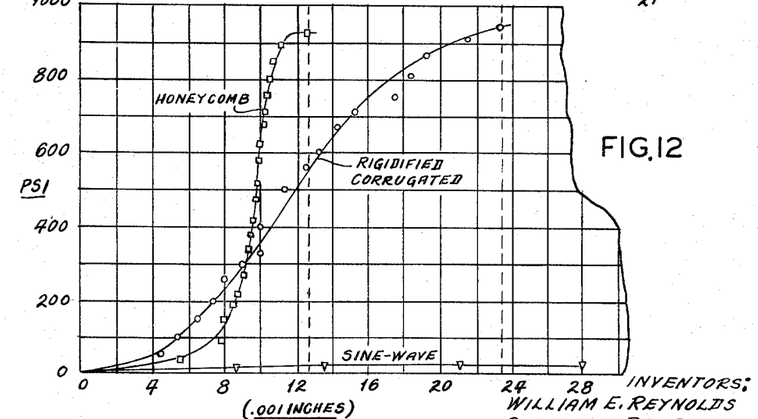
FIG. 12 shows a load-deflection curve for panels in flatwise compression.

FIG. 12 shows a load-deflection curve for panels in flatwise compression, such as in the direction of the arrow B shown in FIG. 5. The vertical load figures are for pounds per square inch and the horizontal deflection figures are for thousandths of an inch.

Sine-wave core exhibits considerable instability without face sheets, especially in flatwise compression. Because the contour includes natural hinge joints in the curve or bend lines, a load applied at the planar crest causes the base legs to rotate around this joint of hinging. Thus, sine-wave core flatens easily.

The core configuration of the present invention overcomes this inherent disadvantage of the sine-wave core. The strength of the present core is derived by ultimately displacing, for example, in a particular embodiment of the invention, segments about 3/16 inch wide along the entire crest of a sine-wave core about 0.060 inch out of the vertical plane, as best shown in FIGS. 3–8, to shorten the effective wall height of the core. During this forming process, the side walls 8 and 17 of the sine-wave form are also displaced or embossed proportionately, but due to their angle with the horizontal, the displacement of the sides or walls is less than the displacement of the more horizontal top and bottom portions. The embossing of the walls adds further resistance to buckling by increasing the moment of inertia for a given thickness of material. This embossing also provides in effect series of flanges in the primary corrugations, said flanges being disposed at an angle to the primary corrugations and being in continuous contacting relation therewith.

For example, the vertical distance from the top 6 of the primary corrugation 2 to the top 15 of the secondary corrugation 3 is about 0.060 inch in a core whose overall height is one-half inch. This approximates 13% of the overall height. Since the same embossing is present in adjacent corrugations, and since the embossed crest has many times the strength of the walls, the part of the corrugation which must resist buckling loads is now approximately 3/4 of the overall height. This reduced wall length or height, like the resulting substantial increase in stiffness, has a corerspondingly beneficial effect upon the load which the panel is able to carry prior to buckling. The present shape of the core shown in FIG. 5 has some characteristics of an A-frame in cross-section and is extremely stiff as distinguished from the relatively weak, unstable sine-wave core.

The rigidified or compound corrugated material of the present invention exhibits many more structural advantages than was expected and compares favorably with honeycomb panel.

Test results for flatwise pressure shown in Table 1 verify the strength of the present rigidified corrugated core G and show it in comparison with honeycomb core h and sine-wave core S.

*Table 1*

FLATWISE COMPRESSION TEST DATA

| Core type | Load at failure, p.s.i. | Displacement at failure, inches |
|---|---|---|
| H | 909.6 | 0.015 |
| H | 929.5 | 0.010 |
| G | 884.5 | 0.0196 |
| G | 755 | 0.0154 |
| G | 936 | 0.0229 |
| G | 718.6 | 0.024 |
| G | 877.7 | 0.019 |
| G | 738.1 | 0.018 |
| S | 38.9 | 0.032 |
| S | 31.79 | 0.063 |
| S | 38.97 | 0.025 |

The honeycomb core H used during these tests was of the 1/4 in. square-cell type and was composed of resistance-welded stainless steel ribbons 0.002 in. thick by 9/16 in. high; its average density was 0.0048 lb./in.³ (core only). The present rigidified corrugated core G dimensions were 0.005 in. thickness, 3/16 in. width for the tops 6 and 15, 1/16 in. length for the connectors 14 between the tops 6 and 15, 0.025 in. length for the connectors 16 between the walls 8 and 17, and 3/16 in. depth in the direction of arrow A in FIG. 1 for the tops 6. This is a typical and satisfactory proportion of parts for a core which is about 1/2 in. high and whose primary corrugations are on centers about 0.7 in. apart. The density for 0.005 in. thick stainless steel was 0.0054 lb./in.³. The sine-wave core S of 0.005 in. thick stainless steel had the same density value as the rigidified core G. All specimens were attached to 17–7 PH stainless steel, 0.020 in. thick face sheets. Each of the rigidified and honeycomb cores G and H were joined to the face sheets by brazing at a temperature of 1650° F. These cores did not deflect when sufficient weight was added during the brazing process to insure a proper bond. The sine-wave core S, on the other hand, being unstable without face sheets, was resistance spot welded to the face sheets. At the elevated furnace temperature, the sine-wave core S could not support the weight required for clamping the face sheets in position. All of the cores in Table 1 were heat treated. Heat treating increases the strength of honeycomb core H by about 35% and of rigidified core G by about 100%. All specimens were tested on a Riehle Universal Testing Machine, Serial No. R-48228, of 60,000 lb. capacity.

These flatwise compression tests set forth in Table 1 and made in the direction of arrow B in FIG. 5 confirm that the present rigidified core has the ability to absorb shock loads, which are loads suddenly imposed or removed. Honeycomb core in flatwise compression tends to buckle as a column. Honeycomb being a very stiff structure, the percentage deflection per unit load is comparatively small up to the point of initial failure. Thus, honeycomb core rapidly transmits a large portion of suddenly imposed loads to the structure attached to it. The present rigidified core, however, approaches failure gradually. The mechanism of failure is prominently yielding by means of a bending or column (wall) failure moment exerted gradually through the legs of the A-frame.

This is an important advantage for many applications. The areas under the curves shown in FIG. 12 indicate that the present rigidified core is capable of absorbing more energy before failure than either a honeycomb or sine-wave core. The present rigidified core thus has the ability to absorb shock loads, which are loads suddenly imposed or removed, to a greater extent through this larger deflection or increased toughness.

Additional experiments in flatwise compression conducted with small samples of the present rigidified core and sine-wave core wherein a face sheet was attached to the bottoms and the load applied normal to the crests indicated that the present rigidified core failed at an average load of 66 pounds whereas the sine-wave core failed at an average load of 5 pounds. This represents a thirteen fold increase in strength over sine-wave core of the same weight.

Table 2 represents the data compiled on a series of edgewise compression tests on honeycomb H, the present rigidified panels G, and sine-wave panels S such as described in connection with Table 1. The test results for sine-wave panels should not be compared directly with the two other types, since spot welding was used to attach the face sheets to the core, whereas seam welding would have been better for the purposes of comparison. In edgewise compression, the present rigidified panel displays directional strength properties. As Table 2 shows, the maximum strength is obtained in a line parallel to the primary corrugations, as shown by arrow C in FIG. 4, although the present rigidified panel exhibits a surprising degree of stiffness at 90 degrees to the direction of corrugation as shown by the arrow D in FIG. 4. This is an advantage over the sine-wave and is due to the secondary corrugations or to the portions off-set from the primary corrugations.

Table 2
EDGEWISE COMPRESSION TEST DATA

| Specimen No. | Core type | Load direction to corrugations | Effective dimensions, in. | | | Total edge area, in. 2 | Load at failure, lb./p.s.i. |
|---|---|---|---|---|---|---|---|
| | | | Length | Width | Overall thickness | | |
| 1 | G | 90° | 3.625 | 3.125 | 0.520 | -------- | 5,200 |
| 2 | H | 90° | 3.562 | 3.500 | 0.625 | -------- | 6,200 |
| 3 | S | Parallel | 3.000 | 3.625 | 0.540 | 0.176 | 2,650/15,057 |
| 4 | G | Parallel | 3.125 | 2.125 | 0.520 | 0.105 | 10,100/96,191 |
| 5 | G | Parallel | 1.750 | 3.625 | 0.520 | 0.179 | 20,000/111,732 |
| 6 | G | 90° | 2.875 | 3.062 | 0.520 | -------- | 5,000 |
| 7 | S | 90° | 2.875 | 3.125 | 0.540 | -------- | 900 |
| 8 | S | Parallel | 2.625 | 2.875 | 0.520 | 0.141 | 2,450/17,376 |
| 9 | G | 90° | 3.000 | 3.125 | 0.540 | -------- | 3,850 |
| 10 | H | 90° | 3.625 | 3.500 | 0.625 | -------- | 9,200 |

In Table 2, specimen numbers 2, 3, 7 and 8 were annealed and all others were heat treated. In specimen 1, the ends of the panel were restrained with inserts spot welded to the face sheets. In specimen 2, the ends of the panel were unrestrained except for platens. In specimens 3, 4 and 10, the ends of the panels were unrestrained. In specimens 5, 6, 7, and 9, the ends of the panels were restrained and imbedded in epoxy resin.

The foregoing tables are merely set forth to illustrate and to support the general finding that the present rigidified corrugated core has a strength-to-weight ratio which approaches that of honeycomb, it being recognized that the comparison is not entirely accurate in view of some differences in the dimensions of the cores available for testing purposes.

The present invention is also embodied in a process for making the rigidified compound corrugations shown in the sheet shown in FIGS. 1–8. This process comprises directing a relatively flat sheet of deformable material through cooperating die rollers to form the primary corrugations 2 one after the other, but forming the secondary corrugations 3 or off-set portions substantially simultaneously with the primary corrugations 2. In other words, the sheet material is directed between the rollers to form the primary corrugations 2 thereacross one after the other, and at the same time, the secondary corrugations 3 are being formed on each primary corrugation 2 because of the spacing, shape and dimensions of the teeth on the rollers.

Figure 7:
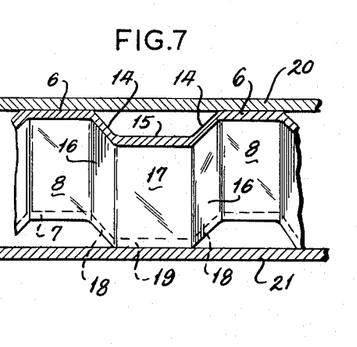
FIG. 7 is a vertical cross-sectional view taken along the line 7—7 of FIG. 5.
Figure 8:
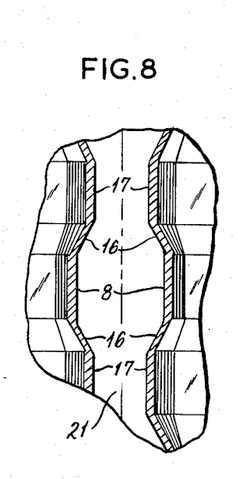
FIG. 8 is a horizontal cross-sectional view taken along the line 8—8 of FIG. 5.

During this process, the material is bent and is substantially simultaneously drawn to form the primary corrugations 2 and secondary corrugations 3 respectively, thereby materially shortening its length in the direction of the arrow A in FIG. 1. The width of the sheet remains substantially the same, however, and the material is stretched at predetermined points to form the secondary corrugations 3. These points of stretching are at the inclined connectors 14, 16, and 18 between the tops, walls and bottoms of the primary and the off-set portions thereof, which are sometimes referred to as the secondary corrugations or portions thereof. This stretching is shown in FIGS. 7 and 8 in which the inclined connectors are shown thinner than the other portions. This stretching occurs both in a lateral and in a longitudinal direction.

Of course, the foregoing process, which will be explained more fully after the machine is described, is one of several processes which can be used to make the compound corrugated core of the present invention. For example, movable dies having the desired primary and secondary corrugation shapes can be used to press a flat formable sheet into the proper shape. In cases where plastic material is used, such as with vertically movable dies, the thickness of the core at any point can be controlled.

After the compound corrugated core 1 has been formed by a single pass of the sheet through the cooperating die rollers shown in FIGS. 13–18, the core 1 is joined with one or two facing sheets or liners 20 and 21 which are bonded to the corrugations in a suitable manner. The joining process should preferably be continuous and be able to join two liners with a core which are all up to for example 120 inches in width. The liners 20 and 21 can be joined to the tops 6 of the primary corrugations 2 and the bottoms 19 of the secondary corrugations 3 by, for example, resin bonding, resistance spot welding, arc spot welding, soldering or brazing or mechanical connections. Individual conditions will dictate the preferred method of joining, since such depends upon the materials used for the core and liners, their heat treatment, their ultimate desired strength, and other factors.

Figure 13:
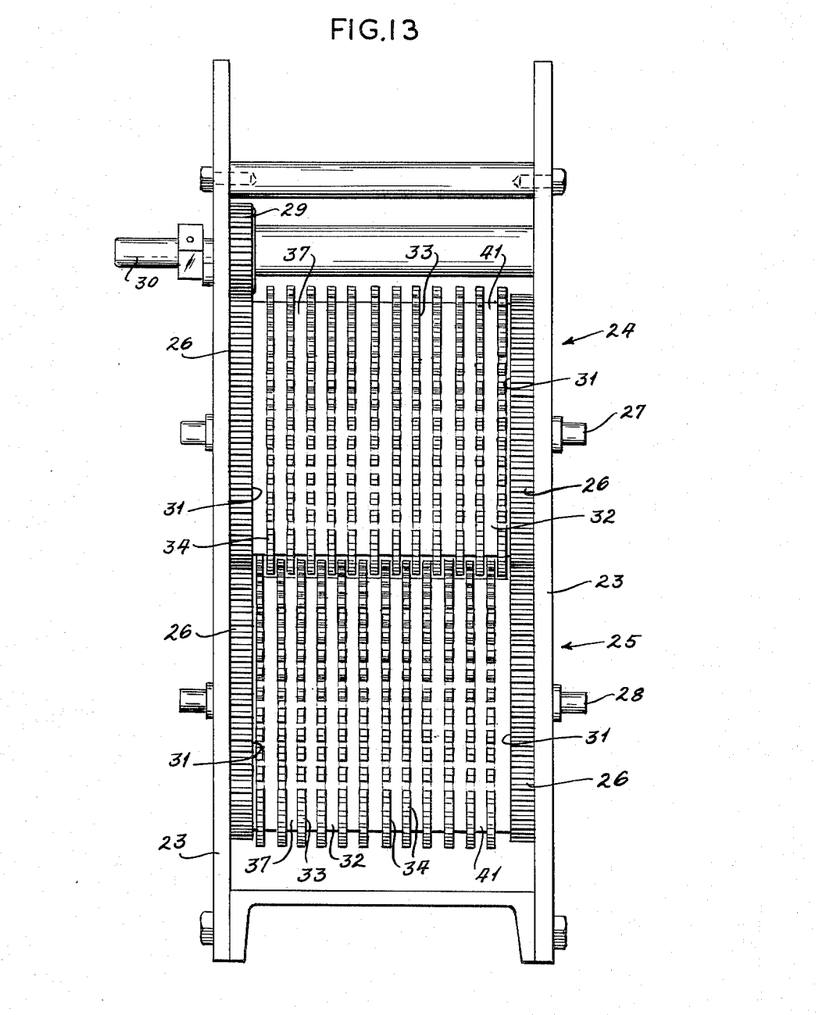
FIG. 13 shows a machine with cooperating die rollers for making compound corrugated sheets.
Figure 14:
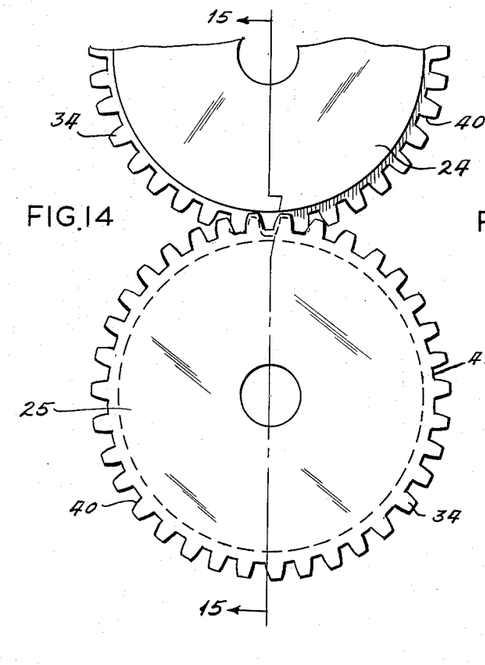
FIG. 14 shows a diagrammatic side view of said die rollers.

The machine for making a preferred form of the core 1 shown in FIG. 1 is best shown in FIG. 13 and comprises a frame 23 having a pair of deforming rolls or die rollers 24 and 25 therein. Any conventional prime mover can be used with the special die rollers 24 and 25 of this invention. Each of the die rollers 24 and 25 has suitable gears 26 at the ends thereof, said rollers and gears being mounted on rotatable shafts 27 and 28 supported in said frame 23. One or more of the gears 26 is powered by a drive gear 29 mounted on a drive shaft 30 secured to a suitable power source or prime mover.

Each of the die rollers 24 and 25 has ends 31 adjacent to said gears 26 with a cylindrical surface 32 therebetween. The cylindrical surface 32 is provided with a plurality of encircling bands 33 with spaces therebetween which are wider than the width of bands 33, so there will be clearance for the sheet material. Each encircling band 33 is provided with a plurality of spaced teeth 34 thereon. As shown, the outer or side faces 35 of the teeth 34 are coextensive with the outer faces 36 of the raised band 33. The teeth 34 on the bands 33 are aligned transversely across the roller as well as circumferentially around the roller.

The other roll is identical to the hereinbefore described roll, except that the roll and/or the teeth thereon are displaced laterally a distance of half the distance between the teeth of the first roll, both transversely and circumferentially, so that the teeth of one roll fit into the valley or depression 37 formed between the four adjacent teeth 34 of the other roll.

Each forming roller 24 and 25 is composed of a number of circular discs 38 and 39 which may be each slightly more or slightly less than 3/16 inch thick. Half of these discs 38 are thinner and are machined much like a gear with the exception that the tooth form 40 is substantially straight rather than involute. The other half of the discs 39 are smaller in diameter but wider in width and serve as spacers to create the cavities 37 into which the tooth forms 34 of the mating roll fit. These rolls do not mesh like two gears, but the teeth 34 are staggered or off-set laterally to form the embossing on the side walls of the A-frame of the core 1 and to off-set the tops 15, walls 17, and bottoms 19. The teeth 34 of one roll protrude past the root 41 and flanks 42 of the teeth 34 in the mating roll, and displace or off-set portions of the crest by pressing the core material into the cavity 37 provided by the spacer discs 39.

Figure 16:
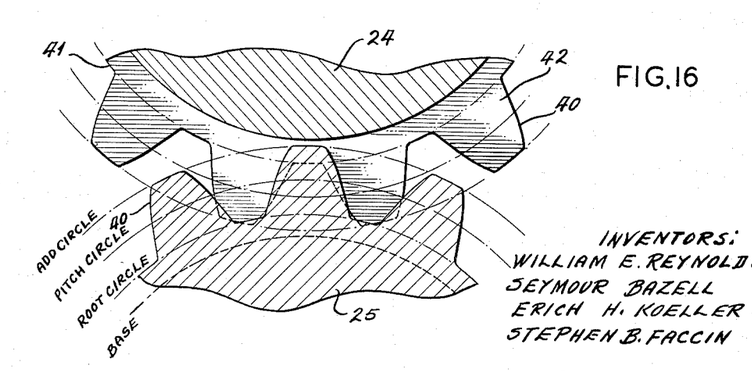
FIG. 16 shows an enlarged fragmentary view of the teeth on said rollers.

FIG. 16 shows a fragmentary view of the relative position of the teeth 34 on each die roller. FIG. 13 shows that the teeth of each die roller are off-set laterally from each other so that the teeth of one die roller cannot mesh with the teeth of the other die roller. FIG. 16 shows that the teeth of one die roller are off-set circumferentially so that the teeth from one die roller are centered circumferentially within the spaces between the teeth of the other die roller.

Figure 17:
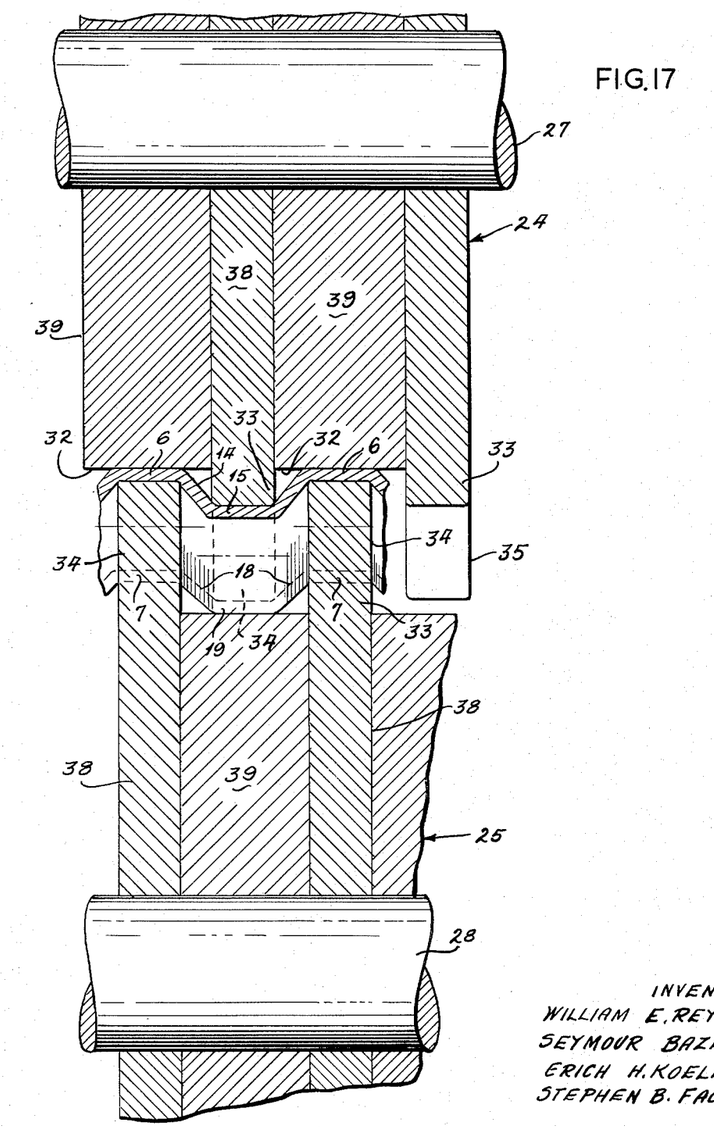
FIG. 17 shows an enlarged vertical cross-sectional view of the die rollers with the material therein.
Figure 18:
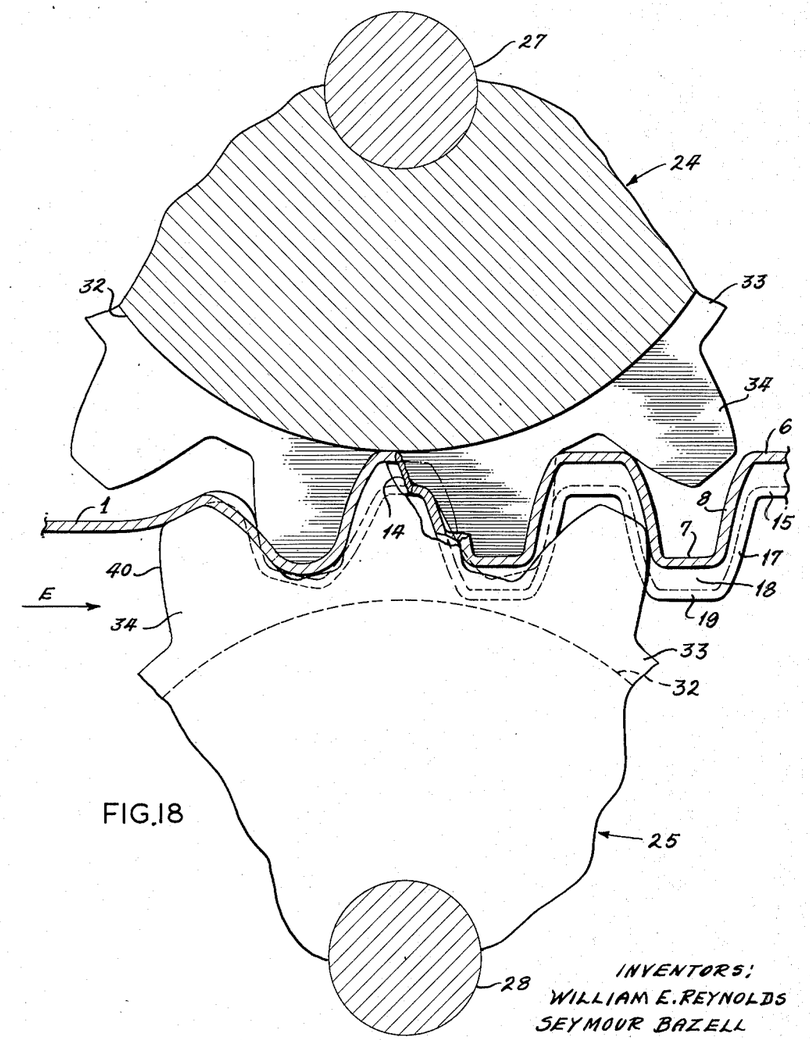
FIG. 18 shows an enlarged sectional view taken along the line 18—18 of FIG. 17 showing the material as it passes through the rollers, the material in this view having slightly curved walls.

FIGS. 17 and 18 show the core 1 between the cooperating die rollers 24 and 25. FIG. 17 shows the teeth 34 of the lower die roller 24 bending the material 1, which in this instance is in contacting relation with the cylindrical surface 32 of the upper die roller 25, although under some conditions this contact need not occur. Similarly, the teeth 34 on the upper die roller 24 bend the material thereover and into the central depressions 37 between the teeth 34 of the lower die roller 25. Whether or not the material is forced into contacting relation with the cylindrical surface 32, the material is held against lateral movement by the plurality of teeth and its width is not materially reduced. As best seen in FIG. 17, the connectors 14 are stretched to the angular distance shown from their original length, which was substantially equal to the lateral distance between teeth of the opposing rollers. This stretching takes place laterally and to some extent longitudinally.

FIG. 18 shows the core material 1 moving from left to right in the direction of arrow E. It will be seen that the material is initially relatively flat and in a neutral plane in regard to the resulting corrugated structure and is fed either in sheets of predetermined length or from a continuous roll or coil of material. The sheet is first bent over a tooth of one roller which forms a bend or corrugation in the material with hardly any trace of a secondary transverse corrugation being formed at this instant. As the rollers 24 and 25 rotate to bring the material 1 into the position directly between the shafts 27 and 28, the primary corrugations are completed and the off-set portions or secondary corrugations are formed substantially at the same time on opposite sides of the corrugated structure neutral plane. During this off-set operation the material is held firmly against lateral movement so that the material is drawn or moved to its off-set position by stretching or expanding the portions which are primarily not in direct contact with the teeth 34.

Figure 15:
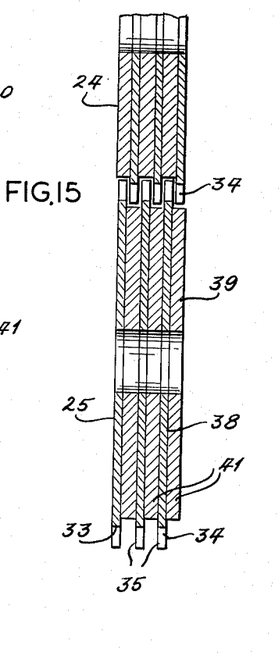
FIG. 15 shows a fragmentary cross-sectional view taken along the line 15—15 of FIG. 14.

This particular roll design has distinct advantages. The flatness of the core 1 as it leaves the rollers 24 and 25 eliminates the need for an extra station for straightening the core 1. By maintaining control on material clearances wrinkling can be prevented. The lateral clearance between the teeth 34 of opposing rolls, as best shown in FIGS. 13 and 15, is approximately the same as the thickness of the sheet material to be rigidified.

This invention is intended to cover all changes and modifications of the examples of the invention herein chosen for purposes of the disclosure, which do not constitute departures from the spirit and scope of the invention.

What we claim is:

1. A rigidified corrugated structure comprising a sheet material formed into compound corrugations including a succession of parallel, equally spaced primary corrugations extending transversely of the sheet material between two opposite edges of said material and each said corrugation having top and bottom portions with walls therebetween, a plurality of longitudinally disposed secondary corrugations in parallel, equally spaced relation in the primary corrugations, said secondary corrugations having top and bottom portions and walls therebetween, the adjacent secondary corrugation walls being equally spaced throughout, said secondary corrugations each being continuous in and between the primary corrugation top and bottom portions and walls and extending between the other pair of opposite edges of the sheet material, the extremities of the compound corrugations on each side of the corrugated structure constituting top and bottom crests, the crests on each side defining a plane with said planes being parallel and spaced apart the height of the corrugated structure, the height of the first mentioned corrugation walls being less than the height of the corrugated structure, the top and bottom crests of the compound corrugations having been formed on opposite sides of a neutral plane.

2. The rigidified corrugated structure set forth in claim 1 wherein a flat sheet is secured to the crests on at least one side of the corrugated structure.

3. The rigidified corrugated structure set forth in claim 1 wherein the crests on each side of the corrugated structure are spaced from each other equally longitudinally and laterally with the top crests of one such structure in secured relation to the bottom crests of another such structure.

4. The rigidified corrugated structure set forth in claim 3 wherein the corrugations of the one such structure are disposed transversely of the respective corrugations of the another such structure.

5. A rigidified corrugated structure comprising a sheet material formed into compound corrugations including a succession of parallel, equally spaced primary corrugations extending transversely of the sheet material between two opposite edges of said material and each said corrugation having top and bottom portions with walls therebetween, a plurality of longitudinally disposed secondary corrugations in parallel, equally spaced relation in the primary corrugations, said secondary corrugations having top and bottom portions and walls therebetween, the adjacent secondary corrugation walls being equally spaced throughout, said secondary corrugations each being continuous in and between the primary corrugation top and bottom portions and walls and extending between the other pair of opposite edges of the sheet material, the extremities of the compound corrugations on each side of the corrugated structure constituting top and bottom crests, the crests on each side defining a plane with said planes being parallel and spaced apart the height of the corrugated structure, the height of the first mentioned corrugation walls being less than the height of the corrugated structure and the major portion of the height of the corrugated structure being constituted by the primary corrugations wtih the secondary corrugations being a lesser portion thereof, the top and bottom crests of the compound corrugations having been formed on opposite sides of a neutral plane.

References Cited by the Examiner

UNITED STATES PATENTS

| | | | |
|---|---|---|---|
| 1,469,220 | 10/1923 | Kemp | 244—87 |
| 1,996,004 | 3/1935 | Fraser | 52—630 |
| 2,481,046 | 9/1949 | Scurlock | 52—615 |
| 2,843,179 | 7/1958 | Wiley et al. | 153—77 |
| 2,907,369 | 10/1959 | Brauer | 153—77 |
| 2,910,153 | 10/1959 | Campbell | 29—191.4 |
| 2,963,128 | 12/1960 | Rapp | 161—133 |
| 3,093,529 | 6/1963 | Freyhold | 156—325 |

FRANK L. ABBOTT, *Primary Examiner.*

WHITMORE A. WILTZ, RICHARD W. COOKE, JR., JACOB L. NACKENOFF, *Examiners.*